(12) United States Patent
Hasek

(10) Patent No.: US 12,416,389 B2
(45) Date of Patent: Sep. 16, 2025

(54) HEADLAMP FOR A CAR WITH A SECONDARY LIGHT SOURCE

(71) Applicant: HELLA AUTOTECHNIK NOVA S.R.O., Mohelnice (CZ)

(72) Inventor: Michal Hasek, Lostice (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 0 days.

(21) Appl. No.: 18/837,084

(22) PCT Filed: Oct. 28, 2022

(86) PCT No.: PCT/EP2022/080293
§ 371 (c)(1),
(2) Date: Aug. 8, 2024

(87) PCT Pub. No.: WO2023/156033
PCT Pub. Date: Aug. 24, 2023

(65) Prior Publication Data
US 2025/0043931 A1    Feb. 6, 2025

(30) Foreign Application Priority Data
Feb. 15, 2022   (CZ) ................................ PV 2022-72

(51) Int. Cl.
*F21S 41/265*  (2018.01)
*F21S 41/143*  (2018.01)
*F21S 41/27*   (2018.01)

(52) U.S. Cl.
CPC .......... *F21S 41/265* (2018.01); *F21S 41/143* (2018.01); *F21S 41/27* (2018.01)

(58) Field of Classification Search
CPC ......... F21S 41/265; F21S 41/27; F21S 41/143
See application file for complete search history.

(56) References Cited

U.S. PATENT DOCUMENTS

| 10,228,108 B2* | 3/2019 | Courcier ............... F21S 41/143 |
| 2019/0145596 A1* | 5/2019 | Suetsugu .............. F21S 41/663 362/521 |

(Continued)

FOREIGN PATENT DOCUMENTS

| CN | 211551479 U | 9/2020 |
| CN | 214038234 U | 8/2021 |

(Continued)

*Primary Examiner* — James R Greece
*Assistant Examiner* — Michael Chiang
(74) *Attorney, Agent, or Firm* — Husch Blackwell LLP

(57) ABSTRACT

A headlamp for a car has a main-beam module and a dipped-beam module. The main-beam module comprises a primary light source and a primary optical element comprising a primary receiving surface and a primary emitting surface which provide the main-beam function. This module includes a secondary light source. The primary optical element comprises a secondary receiving surface and a secondary emitting surface. The secondary emitting surface is formed by refracting surfaces. The luminous intensity of the secondary light source is significantly lower than that of the primary light source. The secondary light source is lit simultaneously with the dipped-beam module and the light from the secondary light source is incident closer to the car than the light from the primary light source.

3 Claims, 4 Drawing Sheets

(56) References Cited

U.S. PATENT DOCUMENTS

| | | | |
|---|---|---|---|
| 2022/0146069 A1* | 5/2022 | Lee | F21S 41/275 |
| 2022/0324376 A1* | 10/2022 | Zhang | F21S 41/24 |
| 2023/0272896 A1* | 8/2023 | Lin | F21S 41/143 |
| | | | 362/459 |
| 2024/0027034 A1* | 1/2024 | Shichijo | F21S 41/176 |

FOREIGN PATENT DOCUMENTS

| | | |
|---|---|---|
| DE | 4229728 C1 | 1/1994 |
| DE | 102018113768 A1 | 12/2019 |
| EP | 3505814 A1 | 7/2019 |
| EP | 3943809 A1 | 1/2022 |
| KR | 20210107344 A | 9/2021 |
| WO | 2020244079 A1 | 12/2020 |
| WO | 2020244391 A1 | 12/2020 |

\* cited by examiner

HEADLAMP FOR A CAR WITH A SECONDARY LIGHT SOURCE

CROSS REFERENCE

This application claims priority to PCT Application No. PCT/EP2022/080293, filed Oct. 28, 2022, which itself claims priority to Czech Application No. 2022-72, filed Feb. 15, 2022, the entireties of both of which are hereby incorporated by reference.

FIELD OF THE INVENTION

The present invention focuses on lamps for cars. Specifically, it relates to a headlamp with a modified main-beam module.

BACKGROUND OF THE INVENTION

In the present state of the art, it is common for car headlamps to comprise, among others, a module for main-beam headlights and a module for dipped-beam headlights. The dipped-beam headlights are used to illuminate the road ahead of the car, e.g., on roads with street lighting and in situations where there are other vehicles, which must not be dazzled, moving in front of or opposite the vehicle under consideration. The main-beam headlights are used to illuminate the road for a greater distance ahead of the vehicle and, in accordance with legislation, must not be used in situations where they would dazzle other drivers. The light emitted from the main-beam module shall be concentrated as much as possible on the lane in front of the vehicle. When driving in low visibility, the dipped-beam headlights are typically permanently lit while the main-beam headlights are only switched on by the driver in situations where this is possible without dazzling other drivers. When viewed from the front, switching off the main-beam headlights may make it seem as if a car approaching from a distance with four lights (two dipped-beam and two main-beam) has changed into a different car with only two lights. For example, when crossing horizons or in bends, this may confuse oncoming drivers who do not know whether they are meeting one or more vehicles.

It would therefore be appropriate to come up with a solution that would limit the change in the appearance of the vehicle when the main-beam headlights are switched off, without dazzling other drivers, and that would not require a major change in the lamp design.

BRIEF SUMMARY OF THE INVENTION

The shortcomings of the solutions known from the state of the art are to some extent eliminated by a headlamp for a car comprising at least a main-beam module and a dipped-beam module. The main-beam module comprises a primary light source for main-beam illumination and a primary optical element that ensures homogenization and directing of light and comprises a primary receiving surface adapted to receive light from the primary light source and a primary emitting surface adapted to emit light from the primary light source. The summary of the invention is that the main-beam module further comprises a secondary light source, wherein the primary optical element further comprises a secondary receiving surface adapted to receive light from the secondary light source and a secondary emitting surface adapted to emit light from the secondary light source. The secondary emitting surface comprises a plurality of refracting surfaces for directing and homogenization of light, it may be a so-called faceted optical surface, for example it may be a Fresnel lens or a part thereof or a plurality of Fresnel lenses or parts thereof.

The refracting surfaces of the secondary emitting surface may be arranged in a plurality of rows and columns. They may be arranged in arcs, they do not have to be arranged at all, etc. It is possible to use any refracting surfaces that ensure a suitable homogeneity of light. The refracting surfaces preferably ensure that the secondary emitting surface is close in shape to the planar element and is located near the focal plane of the secondary optical element when such secondary optical element, in particular one comprising a lens, is part of the lamp. The term "near" here means for example that the distance between the secondary emitting surface of the primary optical element and the focal plane of the secondary optical element is less than one third, more preferably less than one fifth, and even more preferably less than one tenth, of the distance between the secondary emitting surface and the secondary optical element. The secondary receiving and emitting surfaces may form a beam of parallel light rays from the light from the secondary light source and direct it towards the secondary optical element.

At the same time, the luminous intensity of the secondary light source of the main-beam module is at most one tenth, preferably at most one twentieth, compared to the luminous intensity of the primary light source of this module. Consequently, when the primary light source is switched on and the secondary light source is switched off, the light emitted from the primary emitting surface is at least ten times more intense than the light emitted from the secondary emitting surface when the secondary light source is switched on and the primary light source is switched off. The luminous intensity of the primary light source is chosen so that the road is sufficiently illuminated during main-beam lighting. The luminous intensity of the secondary light source is chosen so that it does not substantially affect the main-beam or dipped-beam lighting, but so that the main-beam module appears to be illuminated or back-lit even when the main-beam headlight itself, i.e., the primary light source, is not lit. The amount of light from the secondary light source that is reflected in the primary optical element so that it is emitted through the primary emitting surface, or light that is received by the primary optical element from the secondary light source through the primary receiving surface, is preferably negligible. The light from the primary light source that is emitted through the secondary emitting surface for whatever reason does not affect the function of the invention, since the secondary emitting surface is used to light the main-beam module particularly when the primary light source is not lit. When the primary light source is lit, the light emitted from the secondary emitting surface is drowned out by the light from the primary emitting surface. Preferably, the light emitted from the secondary emitting surface is also drowned out by the light from the dipped-beam module, so that in the so-called far field—in the illuminated part of the road, the light from the lamp of the invention appears as a normal dipped-beam and/or main-beam function.

The maximum luminous intensity of the secondary light source may be, for example, from the interval 500-3000 cd, more preferably 1000-1800 cd. The total luminous flux from this source may be, for example, 40-300 lm, more preferably 75-150 lm, which may be, for example, one tenth to one eighth of the flux from the dipped-beam module light source. The luminous flux of the secondary light source may be distributed between $-/+25°$ horizontally and $-0.86°$ to $-10°$ vertically in the usual coordinate system. At the installation height of the module under consideration, this would correspond to a beam length of 50 m. The vertical distribution of the dipped-beam light is typically −0.57°. The vertical distribution of the light from the secondary light source is therefore preferably lower than that of the dipped-beam light, for example lower than −0.5°, more preferably lower than −0.6° and even more preferably lower than −0.7°, to ensure that the secondary light source does not shine further ahead of the car than the dipped-beam light.

Furthermore, the lamp is adapted for illuminating by the secondary light source of the main-beam module simultaneously with the illuminating by the dipped-beam module. Thus, the secondary light source is lit at least when the dipped-beam headlight is lit. This adaptation may be implemented by connecting the secondary light source to the same control element, e.g., a button in the interior, as the dipped-beam module, or by powering them from the same power supply cable, etc. It is also possible to implement this adaptation by means of a control unit with appropriate programming instructions to ensure that the control unit turns on the secondary light source when the dipped-beam headlight is on.

At the same time, the primary optical element is adapted to direct the light from the secondary light source closer to the car than the light from the primary light source. This adaptation may be implemented in particular by the shape of the primary optical element, for example by an inclination of the emitting surfaces. The primary optical element, and possibly other optical elements, may be made, for example, of glass, of plastic such as PMMA, of silicone, etc.

The lamp described above thus ensures that when the main-beam lighting, i.e., the primary light source of the main-beam module, is switched off, the module does not go out completely, or the whole module does not disappear in the dark, leaving only the dipped-beam headlights and sidelights visible on the car. Therefore, there is no risk of confusing oncoming drivers. Another advantageous effect of the present invention is the improvement of the appearance of the car, for example when presenting the car at a motor show, where the car may be presented with all the modules lit without blinding the audience with the main-beam headlights. No major changes to the lamp design are necessary to provide these functions, for example, in comparison to a standard state-of-the-art lamp, only the primary optical element may be replaced and a secondary light source may be provided, powered from the same conductor as the dipped-beam headlight.

Preferably, the secondary emitting surface is located above or below the primary emitting surface and extends over most, preferably at least three quarters, of its length. Preferably, the secondary emitting surface has a height equal to at least two-thirds of the height of the primary emitting surface. The gap between the primary and secondary emitting surfaces when they are above each other is preferably lower than the height of the primary emitting surface, more preferably it is lower than half the height of the primary emitting surface, and even more preferably it is lower than a quarter of the height of the primary emitting surface. For example, there may even be two secondary emitting surfaces, e.g., one above the primary one and one below it, or both side by side above or below the primary emitting surface. The above dimensions may then apply to each one of them or to the sum of their heights or lengths. However, it is also possible to create a secondary emitting surface, or even a receiving one, significantly smaller than the primary one, for example with less than half the surface area.

Preferably, it is further ensured by suitable homogenizing elements that the light from the primary emitting surface is approximately as homogeneous as the light from the secondary emitting surface. Thus, when viewed from the front of the lamp of the invention, the main-beam module with the primary light source switched on appears approximately as homogeneously lit as when the primary light source is switched off and only the secondary one is switched on. So, for example, the intensity decreases for both emitting surfaces in the direction from the brightest lit point at approximately the same rate.

Preferably, the refracting surfaces, which are part of the secondary emitting surface, are arranged in concentric arcs. This ensures good homogeneity of the light from the secondary light source.

Preferably, the lamp is adapted by the shape of the primary optical element to direct the light from the secondary light source of the main-beam module in the same direction as the light from the dipped-beam module. This adaptation may be implemented mainly by an inclination of the secondary emitting surface, or by an inclination of the refracting surfaces that constitute it. Thus, the light from the secondary light source is incident on the same places as the light from the dipped-beam headlights. Preferably, the intensity or luminous intensity of the secondary light source is significantly lower than that of the dipped-beam light source, for example it is at least ten times lower. Preferably, the light from the dipped-beam headlights and from the secondary emitting surface has approximately the same homogeneity.

The main-beam module may further comprise a secondary optical element comprising shared surfaces for the passage of light from the primary light source as well as the secondary light source. Such an optical element further helps to ensure that at the output of the lamp the homogeneity of the light from the primary light source is approximately the same as the homogeneity of the light from the secondary light source.

BRIEF DESCRIPTION OF DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The invention will be further clarified using exemplary embodiments with reference to the respective drawings. The object of the present invention is a headlamp for a car. This lamp comprises at least two modules, namely a main-beam module and a dipped-beam module. However, it may also comprise other modules, e.g., direction indicator lights, sidelights, fog lights, etc. The main-beam module comprises a primary light source 6 and a primary optical element 1 with a primary receiving surface 2 designed for light reception from the primary light source 6 and a primary emitting surface 3 designed for light emission from the primary light source 6. This source and these surfaces therefore together serve to provide main-beam lighting, in particular they are therefore adapted for shining with sufficient intensity and a sufficient distance in front of the car. For example, the light from the main-beam module may illuminate the road up to 130-160 m in front of the vehicle, while the dipped-beam module may illuminate the road at approximately half that distance, e.g., 60-70 m (both distances are considered under standard visibility conditions and on a level road, factors such as precipitation or road inclination obviously affect these distances). These distances are determined in particular by the shape of the optical elements, such as the primary optical element 1 of the main-beam module and, where appropriate, also its secondary optical element, and similarly for the dipped-beam module. This distance is also influenced, for example, by the inclination of the light sources and their power, or by the rotation of the entire module or lamp.

Figure 2:
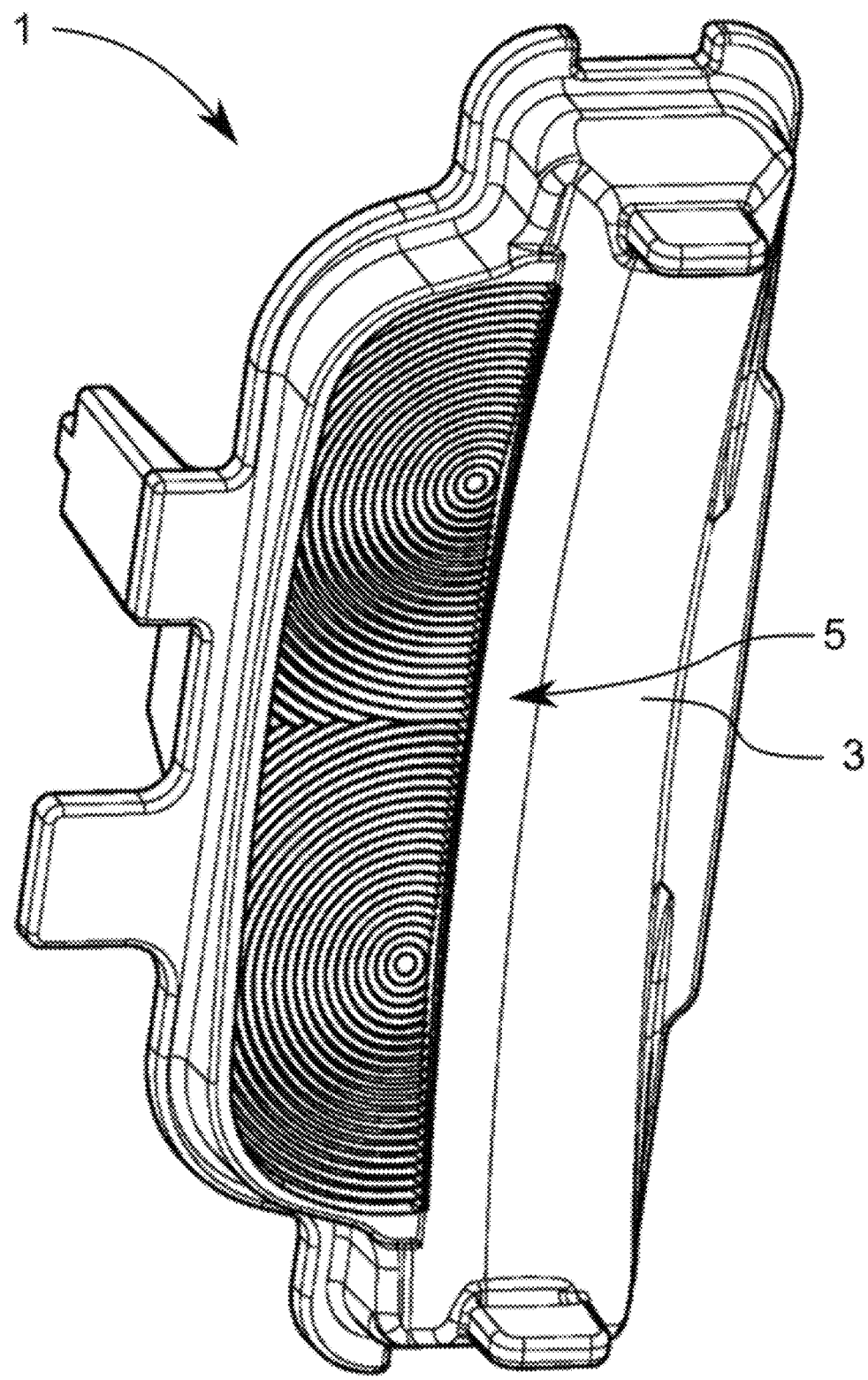
FIG. 2 shows schematically a front view of the optical element of FIG. 1.

The main-beam module further comprises a secondary light source 7 having a significantly lower power than both the primary light source 6 and the light source of the dipped-beam module, for example having a luminous intensity ten to one hundred times lower than the dipped-beam source, and further comprising, on the primary optical element 1, a secondary receiving surface 4 designed for receiving light from the secondary light source 7 and a secondary emitting surface 5 designed for emitting light from the secondary light source 7. The secondary emitting surface 5 comprises a plurality of refracting surfaces. Preferably, these refracting surfaces are arranged in concentric arcs or parts of arcs, especially circular arcs. For example, the refracting surfaces may be arranged in two sets, each containing e.g., 20-40 refracting surfaces, wherein each set consists of arcs centered at a different point, for example as shown in FIG. 2. For example, these refracting surfaces may form a Fresnel lens or a lens of a similar type.

Figure 1:
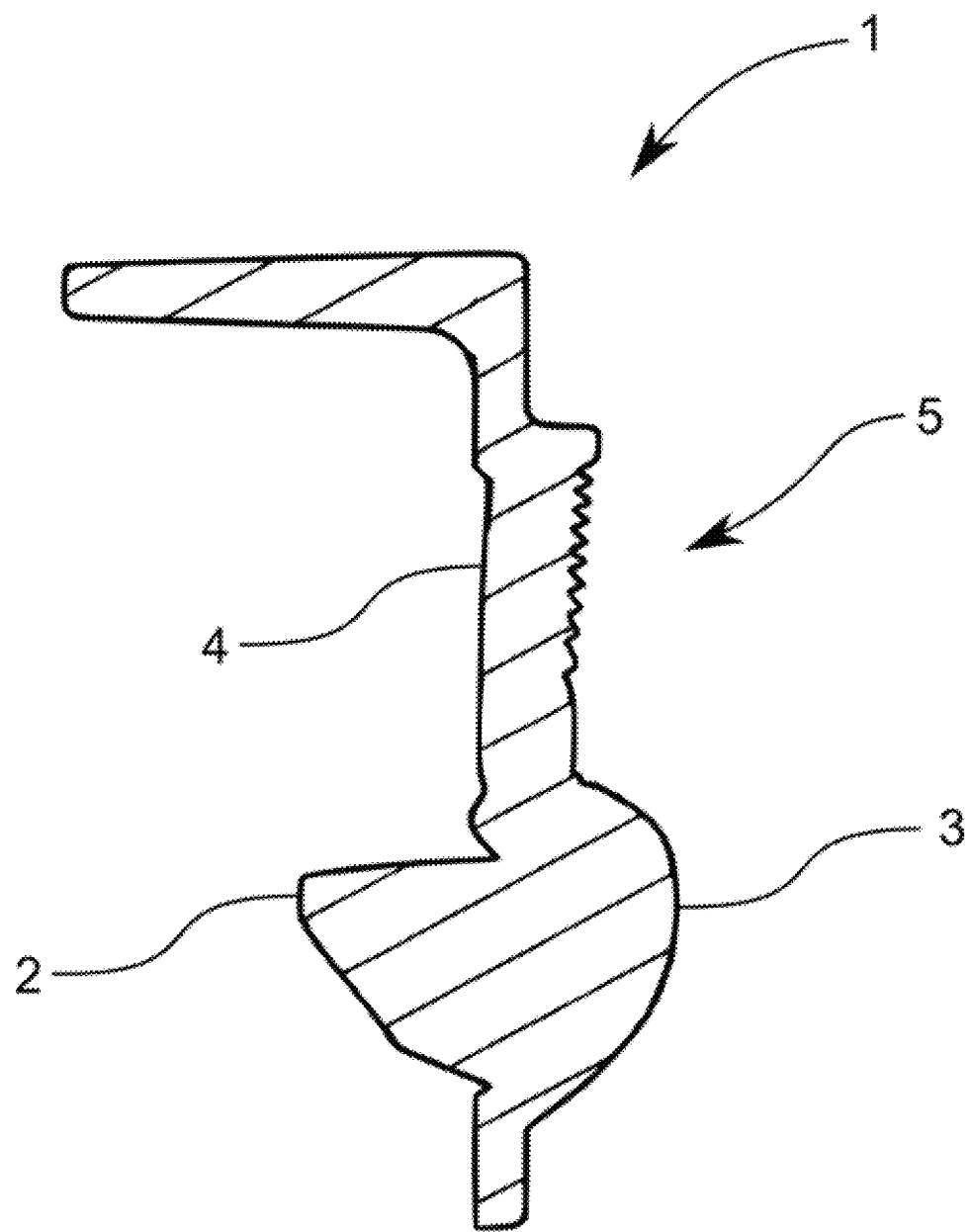
FIG. 1 shows schematically a cross-section of a primary optical element of a main-beam module of a headlamp for a car according to the present invention, wherein the surfaces receiving and emitting light from the primary and secondary light sources are visible.

These refracting surfaces ensure that the light from the secondary source is directed and homogenized. The primary receiving surface 2 and/or the primary emitting surface 3 and/or the secondary receiving surface 4 may also comprise homogenizing elements. The primary optical element 1 preferably comprises collimating protrusions, and the primary receiving surface 2 is discontinuous and divided into several parts—each on one collimating protrusion. One such collimating protrusion can be seen in the cross-section in FIG. 1. For example, one of the LEDs which together form the primary light source 6 may be directed into each of the collimating protrusions. For example, the secondary light source 7 of the main-beam module may be formed by two LEDs, one for each set of concentric refracting surfaces of the embodiment shown. In general, the number of LEDs of both the primary and secondary light source may be substantially arbitrary, but preferably the secondary light source 7 comprises significantly fewer of them than the primary light source, e.g. not more than one third of the number, because it is desirable that, with regard to the illumination of the road, the light from the secondary light source 7 is not at all or at least hardly at all visible to the driver when the primary light source 6 or the dipped-beam module is also lit. In other words, it is desirable that the light from the secondary light source 7 is obscured by the other light from the lamp incident on the road. Preferably the light from the secondary light source 7 is only visible when the lamp is viewed directly from the front when the primary light source 6 is not lit.

The main-beam module is adapted by the choice of the light sources and the shape of the primary optical element 1, or also the form of the other components, such that the light intensity of the light from the secondary light source 7 emitted from the secondary emitting surface 5 is at most one tenth compared to the light intensity of the light from the primary light source 6 emitted from the primary emitting surface 3 (measured when either only the primary or only the secondary light source is switched on). At the same time, the primary optical element 1 ensures that the light from the secondary light source 7 falls closer to the car than the light from the primary light source 6. For example, the distance for the light from the secondary light source 7 from the car at which the relative illumination intensity of the surface relative to the location on the surface with the highest illumination intensity falls below a certain threshold may be one third to two thirds, e.g. half, of the distance for the primary light source 6. For example, the luminous intensity of the secondary light source 7 may be 1200 cd and the luminous flux 100 lm. This luminous flux may be distributed in the direction of e.g. −/+25° horizontally and −0.70° to −10° vertically.

This ensures that the light from the secondary light source 7 does not dazzle oncoming drivers and is not incident on places that, according to legislation, it must not be incident on in cities or when meeting oncoming vehicles. In this way, the secondary light source 7 may be on permanently, i.e., in particular whenever the dipped-beam module is lit. For example, the light source of the dipped-beam module is switched on by the same control element as the secondary light source 7 of the main-beam module, while a separate control element is provided for the primary light source 6. The switching on of the light sources may be done by the driver, but in some embodiments it may also be automatic. In some embodiments, the secondary light source 7 may be switched off when the primary one is switched on and the secondary light source 7 may be switched on when the primary one is switched off, but preferably the lighting of the secondary light source 7 is dependent on the dipped-beam headlights and independent of the primary light source 6. In some embodiments, it may be possible for the secondary light source 7 to be on even when the dipped-beam headlights are not on.

Preferably, the light from the secondary light source 7 is directed in the same direction and thus is incident on the same places as the light from the dipped-beam module. Preferably the intensity of the light from the secondary light source 7 is less than one tenth of the light intensity of the light from the dipped-beam module. Thus, the light from the secondary light source 7 which is emitted from the primary optical element 1 through the secondary emitting surface 5 does not substantially affect either the dipped-beam headlights or the main-beam lighting by the primary light source 6. Thus, the function of the secondary light source 7 is not to illuminate the road, but in particular to ensure that the main-beam module does not appear dark when the primary light source 6 is switched off, but is still lit at a lower intensity, but without dazzling or contravening legislation.

Preferably, the light from the secondary light source at the output of the primary optical element 1 has approximately the same homogeneity as the light from the primary light source 6 but it has a lower intensity. For example, when viewed from the front of the primary optical element 1, the intensity in the direction from the location of the highest intensity to the margins of the given emitting surface may decrease equally rapidly on the primary emitting surface 3 and the secondary emitting surface 5, so that, for example, the location with half the intensity relative to the brightest location is approximately equidistant from the brightest location on both emitting surfaces.

In some embodiments, the lamp may comprise a control unit or be connected to a control unit adapted to ensure that the secondary light source 7 is lit whenever the dipped-beam module is lit. Alternatively, it may be adapted to light the secondary light source 7 whenever the dipped-beam module is lit and the primary light source 6 is not lit, which may be slightly more advantageous in terms of energy consumption. However, in some embodiments, the secondary light source 7 may simply be switched on by the same control element as the dipped-beam headlights, which is the simplest option in terms of manufacturing. For example, such a control element may directly apply voltage to the given source, or instruct the lighting control unit to apply voltage to the given source, etc.

The lamp according to the invention may further comprise, for example, a secondary optical element 8, e.g., a lens. The secondary optical element 8 may have surfaces to reception and emission of light from the primary light source 6 separate from the surfaces for reception and emission of light from the secondary light source 7. Preferably, however, these surfaces are shared, so that light from both the primary and secondary light sources is received by the secondary optical element 8 through the same surface and is emitted from it through the same surface. Furthermore, the lamp may comprise e.g., a frame in which the light sources and optical elements of the individual modules are mounted, a frame in which the individual modules are mounted, a housing forming the outer walls of the modules or the lamp, cover glasses, etc.

In further embodiments, the secondary emitting surface 5 may comprise refracting surfaces arranged, for example, in parallel instead of in arcs. Alternatively, it may comprise more than two sets of refracting surfaces, where the elements of each set are arranged around a different center, or conversely only one such set. In some embodiments, the number of LEDs in the secondary light source 7 may correspond to the number of such centers, in other embodiments each center may, for example, have more than one LED or the LEDs may be aligned with respect to a part other than the center of each such set of refracting surfaces.

In the embodiment shown, the secondary emitting surface 5 is located above the primary emitting surface 3, it is approximately the same height and extends over approximately 90% of its length. In general, the secondary emitting surface 5 may, for example, also be located below the primary one. Preferably, the secondary emitting surface 5 is approximately the same size as the primary emitting surface 3, e.g., it extends over at least 75% of its length and has a height equal to at least 75% of the height of the primary emitting surface 3. The primary emitting surface 3 is, in the embodiment shown, curved outward in the vertical direction and inward in the horizontal direction but generally may be, for example, planar, curved outward in both directions, etc.

Figure 3:
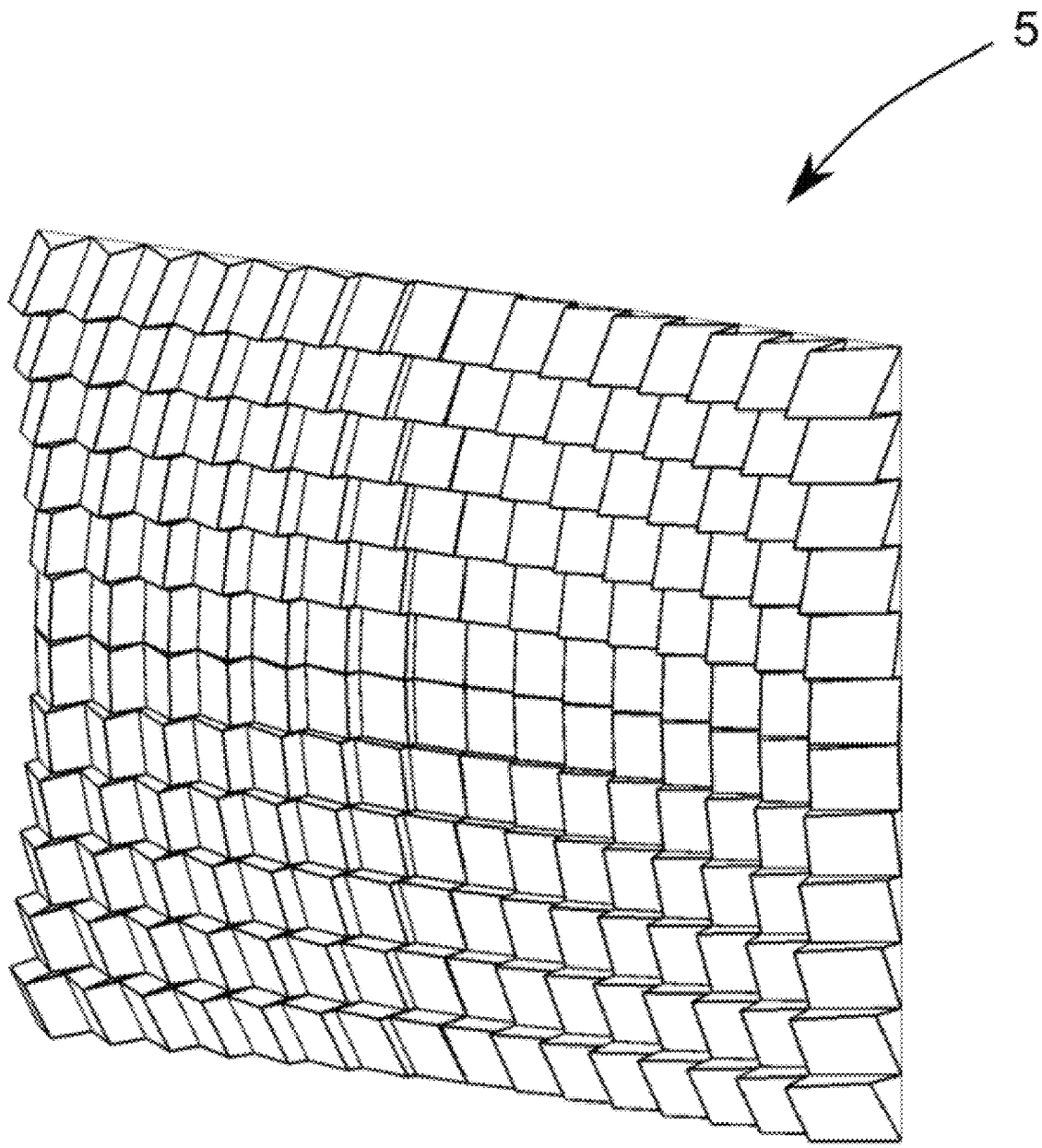
FIG. 3 shows schematically a secondary emitting surface or a part thereof of a primary optical element in an alternative embodiment, wherein the refracting surfaces forming the surface are arranged in a number of rows and columns.

The refracting surfaces of the secondary emitting surface 5 may preferably be arranged in an approximately square grid, so as to form a plurality of rows and columns. An example of such a secondary emitting surface 5 is shown in FIG. 3. For example, the shape of the refracting surfaces may be approximately square or rectangular. The secondary light source 7 may be, for example, a single LED, four LEDs arranged in a rectangle, etc. Their number may be, for example, one twentieth to one fifth, e.g., one tenth, of the number of LEDs forming the primary light source 6.

Figure 4:
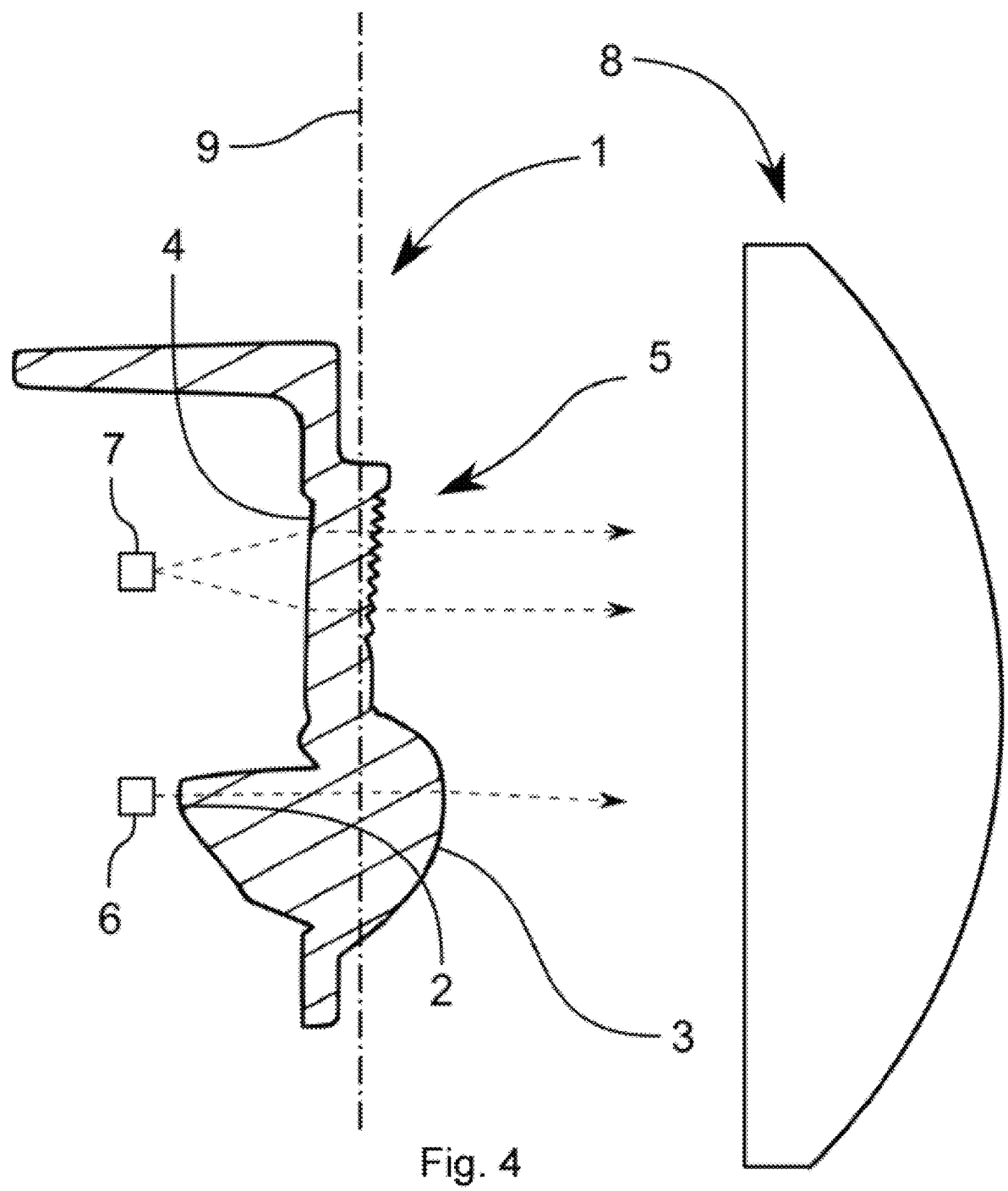
FIG. 4 shows schematically an arrangement of a primary and a secondary optical element of a lamp according to the invention with a primary and secondary light source.

FIG. 4 shows a possible arrangement of the components of the lamp of the invention. The primary light source 6 and the secondary light source 7 are positioned one above the other. The light emitted from the secondary emitting surface 5 forms approximately parallel rays, and this emitting surface is in close proximity to a focal plane 9 of the secondary optical element 8.

LIST OF REFERENCE NUMBERS

1—Primary optical element
2—Primary receiving surface
3—Primary emitting surface
4—Secondary receiving surface
5—Secondary emitting surface
6—Primary light source
7—Secondary light source
8—Secondary optical element
9—Focal plane of the secondary optical element

The invention claimed is:

1. A headlamp for a car, the headlamp comprising:
at least a main-beam module including:
  a primary light source for main-beam lighting,
  a secondary light source,
  a primary optical element having:
    a primary receiving surface for receiving light from the primary light source,
    a primary emitting surface for emitting light from the primary light source,
    a secondary receiving surface for receiving light from the secondary light source, and
    a secondary emitting surface for emitting light from the secondary light source, the secondary emitting surface having a plurality of refracting surfaces for directing and homogenizing light; and
a dipped-beam module;
wherein a luminous intensity of the secondary light source is at most one tenth of the luminous intensity of the primary light source,
wherein the main-beam module is illuminated by the secondary light source at the same time as illuminating by the dipped-beam module,
wherein the primary optical element directs the light from the secondary light source closer to the car than the light from the primary light source.

2. The headlamp of claim 1, wherein the primary optical element is configured to direct the light from the secondary light source of the main-beam module in the same direction as the light from the dipped-beam module.

3. The headlamp of claim 1, wherein the main-beam module further comprises a secondary optical element having shared surfaces for the passage of light from both the primary light source and the secondary light source.

* * * * *